United States Patent Office 3,677,883
Patented July 18, 1972

3,677,883
POLYVINYL ACETATE ADHESIVES CONTAINING
INORGANIC ZIRCONIUM SALTS
Stanley R. Sandler, Springfield, Pa., assignor to The
Borden Company, New York, N.Y.
No Drawing. Filed Nov. 20, 1967, Ser. No. 684,539
The portion of the term of the patent subsequent to
Dec. 15, 1987, has been disclaimed
Int. Cl. B32b 23/04, 27/30
U.S. Cl. 161—251
9 Claims

ABSTRACT OF THE DISCLOSURE

This invention relates to adhesive compositions which form water resistant bonds when cured and more particularly to ambient temperature curing aqueous adhesive compositions which form indistinguishable glue lines comprising a vinyl acetate polymer and a curing agent selected from the group consisting of water-soluble zirconium and zirconyl salts.

BACKGROUND OF THE INVENTION

Vinyl acetate polymers, used alone or with cross-linking thermosetting resins, provide generally suitable adhesives which give water resistant bonds when cured at ambient temperatures. While satisfactory for most uses, curing agents heretofore used tend to discolor the adhesive and for that reason make it unsatisfactory in the manufacture of furniture, such as flush panel doors, where it is desired that the glue line be indistinguishable and blend with the color of the wood. For example, chromium nitrate imparts a greenish-bluish color to the adhesive making it unsuitable for the furniture use noted. While some free acids may also form a colorless bond they must be used in such proportion as to cause some deterioration of the wood.

SUMMARY OF THE INVENTION

An improved vinyl acetate adhesive has now been found which can be cured at room temperature to form bonds which blend in color with the substrate being adhered.

Briefly stated, the present invention is directed to aqueous adhesive compositions which form a water resistant bond when cured at ambient temperature comprising a vinyl acetate polymer and a curing agent selected from the group consisting of zirconium and zirconyl salts and to structures utilizing said adhesives. In a preferred embodiment a thermosetting resin or resins cross-linkable with the vinyl acetate polymer is incorporated to provide maximum water resistance.

DETAILED DESCRIPTION

As used herein, the term "vinyl acetate polymer" includes any homopolymer or copolymer latex or emulsion used for preparing water resistant adhesives as more particularly described in Pats. Nos. 2,902,458; 2,902,459; and 3,274,048; and for best water resistance, copolymers of vinyl acetate and acrylic acid, preferably one containing about 98% vinyl acetate and 2% acrylic acid.

The thermosetting resin that is used can be any curable compound cross-linkable with the vinyl acetate polymer selected from the group consisting of phenol-formaldehyde adducts such as phenolic resoles and trimethylol phenol, N-hydroxymethyl reactive monomers, and mixtures thereof. Of the phenolics the phenol-formaldehyde resole types are preferred. Other suitable examples are described in Pat. No. 2,902,459. The N-hydroxymethyl reactive monomers used are polyalkoxyalkyl and polyalkanol diazines, triazines, tetrazines, imidizolidinones, thioimidizolidinones, and mixtures thereof. Specific examples are hexamethoxymethyl melamine, tetrabutoxymethyl benzoguanamine, and 1,3-dihydroxymethyl-4,5 dihydroxy-2-imidizolidinone. For best results when maximum water resistance is required the N-hydroxymethyl monomer can be admixed with the above-noted phenolic resin and reacted with the vinyl acetate copolymer in the presence of a curing agent of the present invention.

The curing agent can be any water soluble zirconium or zirconyl salt; most desirably a salt selected from the group consisting of zirconyl bromide and chloride, zirconyl nitrate, zirconium nitrate, basic zirconium oxychloride, and mixtures thereof. It is preferred to use the curing agent in aqueous solution since it will thereby be more uniformly dispersed throughout the adhesive composition for maximum effect.

As to proportions, it is preferred to use no more than 12 parts by weight of the curing agent based on 100 parts by weight of adhesive resin solids (i.e., vinyl acetate polymer, phenolic resin, and/or N-hydroxymethyl monomer solids). Proportions up to 20 parts by weight or more can be used, but are not recommended because they may give decreased water resistance. The minimum proportion of curing agent required is dependent upon the particular resins used in the adhesive, but usually at least about 1 part by weight of curing agent is required.

For best commercial results it is preferred to use in the adhesives the following proporations by weight, 40–100 parts copolymer, 0–60 parts phenolic resin, 0–10 parts N-hydroxymethyl reactive monomer, and 1–12 parts of curing agent.

In compounding the adhesives, if thermosetting agents are used, it is recommended that the thermosetting agent be first blended with the vinyl acetate polymer latex. The curing agent is not added until shortly before the adhesive composition is to be used.

The invention will be further described in connection with the following examples of the practice of it which are set forth for the purpose of illustration only.

Example 1

An adhesive was prepared having the following composition:

|  | Parts by weight |
|---|---|
| Vinyl acetate copolymer emulsion (50% solids, 98% vinyl acetate-2% acrylic acid) | 70.00 |
| Water | 3.10 |
| Hexamethoxymethyl melamine (100% solids) | 8.35 |
| Methanol | 9.00 |
| Phenol-formaldehyde resole (75% solids P/F ratio of 1.13/2.24) | 9.55 |
|  | 100.00 |

To the above was added just prior to use 5 parts by weight of zirconium nitrate in the form of a 48% aqueous solution. The adhesive was then tested using the accepted product Standards PSI–66 (National Bureau of Standards) as recommended in TS–101(d). The adhesive was applied at the rate of 45 lbs./1,000 sq. ft., single glue line, to each side of the cores of a 3/16 inch thick Douglas fir veneer. The cores were bonded with 1/8 inch thick Douglas fir veneer on both sides. The 3-ply specimens were kept compressed for 20 minutes under light pressure and then kept compressed under 150 p.s.i. for 1 hour at room temperature. The specimens were aged for 7 days in a constant-temperature and humidity environment and the specimens cut into 1" by 3" portions and tested for tensile shear strength in dry, boil and vacuum-pressure tests as set forth in the Standards noted above. The results are as follows:

TABLE I

Tensile shear strength, p.s.i. percent wood failure[a]

Dry _____ 207-100
Boil[b] _____ 171-100
Vacuum-pressure test[b]_____ 188-100

[a] Average of at least three test specimens.
[b] Samples were not delaminated after drying for 24 hours at 145° F.

In every instance the glue line blended in color with the surrounding wood areas.

Examples 2-10

A series of adhesives were made with different zirconium and zirconyl catalysts and with varied resins. The adhesives were compounded and tested as set forth in Example 1 and the results and adhesive formulations (in grams) are set forth in Table II.

TABLE II

| Example No. | Latex [a] (50% solids) | Phenolic resin [b] | N-hydroxy-methyl reactive monomer | Curing agent [c] | Tensile shear strength, p.s.i., percent wood failure | | |
|---|---|---|---|---|---|---|---|
| | | | | | Dry | Boil | Vacuum-pressure |
| 2 | 71 | 10 | 0 | 10.3 | 125-100 | 115-100 | 95-90 |
| 3 | 71 | 10 | 0 | 10.3 | 180-100 | 175-100 | 155-100 |
| 4 | 100 | 7.2 | 0 | 8 | 100-100 | 65-100 | 75-100 |
| 5 | 100 | 0 | 0 | 5 | 85-90 | 85-80 | 40-20 |
| 6 | 71 | 10 | [1] 3 | 10.3 | 125-100 | 70-90 | 70-80 |
| 7 | 71 | 10 | [2] 5 | 10.3 | 145-100 | 110-100 | 125-50 |
| 8 | 100 | 7.2 | 0 | 10.3 | 65-100 | 100-100 | 80-60 |
| 9 | 100 | 7.2 | 0 | 10.3 | 70-90 | 100-100 | 65-80 |
| 10 | 100 | 7.2 | 0 | 10.3 | 70-100 | 90-100 | 70-70 |

[a] In all examples a copolymer of 98% vinyl acetate and 2% acrylic acid was used.
[b] Examples 2-7 utilized the same phenolic resin as used in Example 1. In Examples 9, 10, and 11, the P/F ratios were, respectively, 2.13/3.21; 2.13/2.10; and 2.13/2.58.
[c] The curing agent used in Examples 2, 3, and 6 through 10 was a ZrO(OH)Cl (39% solids) aqueous solution and in Examples 4, 5, Zr(NO₃)4 (48% solids) aqueous solution.
[1] Hexamethoxymethyl melamine with 9 grams CH₃OH and 3.1 grams water.
[2] 1,3-dihydroxymethyl-4,5-dihydroxy 2-imidizolidinone.

The tests were made after being aged for 7 days for Examples 3 to 7 and at 28 days for Examples 2 and 8 to 10. In all cases a "whitish" glue line was formed which blended in color with the surrounding wood.

Example 12

A series of adhesives are made using the identical formulation set forth in Example 1 except that the following curing agents are each separately, and in turn, substituted in equal proportions by weight for the zirconium nitrate used therein: zirconyl bromide, zirconyl chloride, and zirconyl iodide. In each case a "colorless" glue line is obtained; one that is difficult to distinguish from the wood.

Example 13

A series of adhesives are made using the identical formulation set forth in Example 1 except that the vinyl acetate copolymers disclosed in Pats. Nos. 2,902,458; 2,902,459; and 3,274,048 referred to above are each separately, and in turn, substituted in equal proportions by weight for the vinyl acetate copolymer disclosed therein. In each instance a "colorless" glue line is obtained.

It is preferred to use the adhesives in the form of an aqueous composition with the solids percentage varied from 30% to 70% to give optimum adhesive results for the conditions prevailing. As previously noted, the adhesives of the present invention are most suitable in the production of cellulosic structures such as plywood and other wood and paper products.

It will be understood that it is intended to cover all changes and modifications of the examples of the invention herein chosen for the purpose of illustration which do not constitute departures from the spirit and scope of the invention.

What is claimed is:

1. An aqueous adhesive composition curable at ambient temperature comprising 40-100 parts by weight of a vinyl acetate polymer and 1-20 parts by weight of a curing agent selected from the group consisting of inorganic, water soluble zirconium and zirconyl salts dispersed throughout said composition.

2. The adhesive composition of claim 1, including a reactant cross-linkable with said polymer selected from the group consisting of phenol-formaldehyde adducts, N-hydroxymethyl reactive monomers and mixtures thereof, amount of phenol-formaldehyde adducts being in the range of 0-60 parts by weight and amount of N-hydroxymethyl reactive monomers being in the range of 0-10 parts by weight.

3. The adhesive composition of claim 2, wherein the vinyl acetate polymer is a copolymer made from vinyl acetate and acrylic acid, the cross-linking agent is a combination of a phenol-formaldehyde resole and a polyalkoxyalkyl melamine, and the curing agent is selected from the group consisting of zirconyl bromide, zirconyl chloride, zirconyl iodide, zirconyl nitrate, zirconium nitrate, basic zirconium oxychloride, and mixtures thereof.

4. The adhesive composition of claim 3, wherein the curing agent is basic zirconium oxychloride present in the proportion of from about 1 to about 12 parts by weight for each 100 parts by weight of resin solids in the adhesive.

5. The adhesive composition of claim 3, wherein the curing agent is zirconium nitrate present in the proportion of from about 1 to about 12 parts by weight for each 100 parts by weight of resin solids in the adhesive.

6. The adhesive composition of claim 4, wherein the vinyl acetate polymer is a copolymer of about 98% vinyl acetate and about 2% acrylic acid.

7. The adhesive composition of claim 5, wherein the vinyl acetate polymer is a copolymer of about 98% vinyl acetate and about 2% acrylic acid.

8. A structure comprising at least two cellulosic layers adhesively bound together by the adhesive of claim 3 in a cured condition.

9. A wood structure comprising at least two layers of wood adhesively bound together by the adhesive of claim 1 in a cured condition.

References Cited

UNITED STATES PATENTS

| 2,819,237 | 1/1958 | Daniel | 260—29.3 |
| 3,284,280 | 11/1966 | Armour | 260—29.3 |
| 3,433,701 | 3/1969 | Armour | 260—29.3 |
| 2,310,223 | 2/1943 | Eaton et al. | 260—89.1 |
| 3,285,895 | 11/1966 | Mackenzie et al. | 260—89.1 |

DONALD J. ARNOLD, Primary Examiner

U.S. Cl. X.R.

161—261, 263; 260—29.3, 29.6 R